US006418462B1

(12) United States Patent
Xu

(10) Patent No.: US 6,418,462 B1
(45) Date of Patent: Jul. 9, 2002

(54) GLOBAL SIDEBAND SERVICE DISTRIBUTED COMPUTING METHOD

(75) Inventor: Yongyong Xu, 1271 Lakeside Dr. #2139, Sunnyvale, CA (US) 94086

(73) Assignee: Yongyong Xu, Sunnyvale, CA (US)

( * ) Notice: Subject to any disclaimer, the term of this patent is extended or adjusted under 35 U.S.C. 154(b) by 0 days.

(21) Appl. No.: 09/227,495

(22) Filed: Jan. 7, 1999

(51) Int. Cl.[7] .............................................. G06F 13/00
(52) U.S. Cl. ...................... 709/201; 709/235; 709/239; 709/238; 709/203; 712/28; 712/29; 705/14; 705/37
(58) Field of Search ................................ 709/201, 203, 709/235, 239, 238; 712/28, 29; 705/14, 37, 35

(56) References Cited

U.S. PATENT DOCUMENTS

| | | | | |
|---|---|---|---|---|
| 5,826,244 A | * | 10/1998 | Huberman | 705/37 |
| 5,889,989 A | * | 3/1999 | Robertazzi et al. | 709/105 |
| 5,905,872 A | * | 5/1999 | DeSimone et al. | 709/245 |
| 6,009,455 A | * | 12/1999 | Doyle | 709/202 |
| 6,067,611 A | * | 5/2000 | Carpenter et al. | 712/28 |
| 6,078,906 A | * | 6/2000 | Huberman | 705/37 |
| 6,112,225 A | * | 8/2000 | Kraft et al. | 709/202 |
| 6,240,462 B1 | * | 5/2001 | Agraharam et al. | 709/238 |

OTHER PUBLICATIONS

Carl A. Waldspurger et al.; Spawn: A Distributed Computational Economy; IEEE Transactions on Software Engineering; vol. 18, No. 2; ISSN 0098–5589; pp. 103–117; Feb. 1992.*

Noam Camiel et al.; The POPCORN Project—An Interim Report Distributed Computation over the Internet in Java; 6th International World Wide Web Conference (WWW6); Apr. 7–11, 1997.*

Kam Hong Shum et al.; A Load Distribution Through Competition of Workstation Clusters; 9th International Symposium on Computer and Information Sciences; pp. 1–8; Nov. 1994.*

Jonathan Farringdon; A Web Computer A Super Computer for the Masses; http://www.wizzo.demon.co.uk/webcom/wc02.html; Buxton House Research; 1996.*

Diane L. Davisson et al.; Dynamic Resource Brokering for Multi–User Query Execution; Proceedings of the 1995 ACM SIGMOD International Conference on Management of Data; pp. 281–292; May 1995.*

Yongyong Xu; Global Sideband Service Distributed Computing Method; Proceedings of the Communication Networks and Distributed Systems Modeling and Simulation; 1998 Western MultiConference; pp. 153–158; Jan. 11–14, 1998.*

Bernardo A. Huberman et al.; Distributed Computation as an Economic System; Journal of Economic Perspectives; vol. 9, No. 1; pp. 141–152; Winter 1995.*

Michael May; Idle Computing Resources as Micro–Currencies—Bartering CPU Time for Online Content; AACE WebNet99; Oct. 25–30, 1999.*

(List continued on next page.)

*Primary Examiner*—Kenneth R. Coulter

(57) ABSTRACT

A new method of distributed computing, sideband computing, that is global, scalable and can utilize many idle CPU resources worldwide. Sideband is defined as when a user connects to some (normal) network services, a separate communication channel is opened, through which a server distributes its tasks to all the clients and collects the results later. By this method, any network server which has a lot of clients can compute very large parallel computing problems by dividing it into small individual parts and have them calculated by its clients. With little cost, the network server can act as a supercomputer.

18 Claims, 1 Drawing Sheet

OTHER PUBLICATIONS

Michael May; Distributed RC5 Decryption as a Consumer for Idle–Time Brokerage, DCW99 Workshop on Distributed Computing on the Web; Jun. 21–23, 1999.*

Michael May; Locust—A Brokerage System for Accessing Idle Resources for Web–Computing; Proceedings of the 25th Euromicro Conference; vol. 2, pp. 466–473; Sep. 8–10, 1999.*

Rajkumar Buyya et al.; A Case for Economy Grid Architecture for Service Oriented Grid Computing; Proceedings of the 15th International Parallel and Distributed Processing Symposium; pp. 776–790; Apr. 23–27, 2001.*

Rajkumar Buyya et al.; Compute Power Market: Towards a Market–Oriented Grid; First IEEE/ACM International Symposium on Cluster Computing and the Grid; pp. 574–581; May 15–18, 2001.*

Rishab Aiyer Gosh; The Rise on an Information Barter Economy; Electric Dreams #37; Nov. 21, 1994.*

Noam Nisan et al.; Globally Distributed Computation over the Internet—The POPCORN Project; 18th International Conference on Distributed Systems; May 26–29, 1998.*

Ori Regev; Economic Oriented CPU Sharing System for the Internet; Master of Science in Computer Science thesis; Institute of Computer Science; The Hebrew University of Jerusalem; Jul., 1998.*

* cited by examiner

GLOBAL SIDEBAND SERVICE DISTRIBUTED COMPUTING METHOD

BACKGROUND OF THE INVENTION

1. Field of the Invention

The present invention relates in general to distributed computing, and more particularly to parallel computing and web computing. This method is disclosed first in a paper entitled "Global Sideband Distributed Computing Method" on Jan. 13, 1988 at the Western MultiConference (WMC'98) by the Society for Computer Simulation (SCS).

2. Description of the Related Art

1) In the Internet, there are a lot of CPU resources that are far from being fully utilized The computer industry is a fast growing industry. Every day faster computers are introduced to the world. From the Intel 8086 to the Pentium, CPU speed has more than tripled. However, the utilization of CPU power still can not keep up with the growth of the computer chip industry. As a result, there are more and more idle CPU cycles in computers in the world. For example, a typical office computer would be idle 80% of the time and most home computers are used only as Email and news reader or word processors that consume less than 30% of the computing power for a modem Pentium CPU.

On the other hand, the need for larger computing power is not decreasing. For example, complex differential equations, neural network simulations and other design tasks at big entities such as GM or NASA certainly have strong demands for huge computing power. One way to fulfill those demands is a supercomputer which is 10 to 100 times faster than a desktop PC. However, the expense is so high that it is normally beyond the budget. Another good solution is distributed computing. However, traditional distributed computing has some limits that are not easy to overcome.

Since there is much more idle CPU power worldwide, if we can develop a method to utilize it, we can save a lot of wasted processing power. This invention discloses a new method—a global sideband service distributed computing method to achieve that goal.

2) Traditional distributed computing has a lot of limits

Normally, in distributed computing, we can access more computer power, memory and I/O bandwidth by connecting several machines together. Groups of machines can provide high performance more cheaply than traditional supercomputers. Based on this concept, people have developed several distributed systems such as PVM, MPP or recently CORBA and JOE.

However, there are some limits that are uneasy to overcome. For example, one limit is the maximum number of computers in a group. PVM sets a maximum number of computers at 4095. Some methods are based on a local network. As a result, it is difficult to enable distributed computing in a worldwide environment.

Another prominent dissatisfying limit is accessing each participating computer. For example, in PVM, if a user wants 1000 computers to work together, he has to physically locate them and obtain accounts from each node. It also limits the scalability in that no idle computer in the world is allowed to join the distributed computing group freely.

Pat. WO 98/00780 entitled "Client—Server Technique for Distributed Computing" disclosed a method for remotely running server applications through a web interface. It is useful for client administration and metering of application usage but is not a general distributed computing method.

U.S. Pat. No. 5,740,362 entitled "Management of Network Distributed Agents in a Distributed Computing Environment" disclosed a method providing a single access point for resources distributed within a network but traditional limits still apply.

In summary, the premise of a traditional solution is that a user already has direct access to all the participating computers. This requires the user either physically owning the computers or having to pay for their use. Therefore the expense is not ignorable and sometimes is not practical. Furthermore, it doesn't make use of many idle computers scattered around the world.

The method disclosed here, to some extent, can overcome these limitations. It is significantly different from traditional distributed computing methods.

3) network servers can attract enormous numbers of clients

As the Internet is growing hotter, more computers are getting connected. In 1993, there were 2,152,000 hosts on the Internet and it is estimated to have 100,000,000 in 1998. Together with the invention and development of many new tools and technologies such as WWW, CGI, JAVA, CORBA and so on, Internet services are also becoming common to users. In principle, any host that offers some service can be regarded as a server, like a web server, gopher server, news server, chat server or game server.

Most network servers are designed on a client—server basis in which clients connect to a server, begin a conversation to get information or perform an operation. This conversation is also called a transaction or session. Usually, the server is the information provider and the client is the receiver. The goal of the service provider is to attract as many users (clients) as possible.

Because of the infinite size of the Internet, popular servers have many clients. For example, very hot web servers such as the Yahoo search engine could be accessed nearly 10,000 to 1,000,000 times daily. It is also common that at a given time, a game server could have thousands of clients implementing a fighting or mud game for hours per day. Statistics show that during the games between Deep Blue and Kasparov last year, the news web page of IBM's Deep Blue was accessed more than 1 million times per day.

Here we can see that good servers entice many users to access, thus there is an opportunity for the server to distribute tasks to them during conversations. This is the basis of our sideband service method.

4) Sideband service is another channel of conversation between client and server Under normal situations, the server provides information, service or something else and the client receives them passively. If the server asks the clients to perform some tasks for it, then the role for both sides is reversed and usually another separate conversation must be set up. This type of connection only exists when clients connect to a server for the service it requires and cannot exists by itself. The term sideband channel (or separate dedicated communication channel) is derived from this scenario.

Since most computers on the Internet have quite huge amounts of idle CPU time, it is natural that the server can use it for parallel computing. The only limit is that the tasks the client can perform shouldn't influence the overall performance of the client computer, nor should it take too much time (longer than normal conversation). The client might need to transfer back results to the server. Therefore by assigning different tasks to different clients, the server can acquire huge amounts of computer time since the number of clients can be very large (more than 1 million per day in some cases).

In sideband service, the relationship between client and server is reversed in the process of computing. For sideband service, clients performing some task for the server may be regarded as a dynamic server since it serves as a "computing server".

5) Benefit of the sideband service computing method

There are at least two benefits of sideband service: one is that if many many clients work together, we can achieve something that is hard or impossible by a single computer. The other is that commercial value can arise from sideband service, as it could be regarded as a service charge to maintain the normal network service.

In summary, in sideband distributed computing, the server can ask all clients to work for it at the same time the server provides the clients some service. Clients gain access to the service and in return, they pay back with part of their idle computing resource. It is the computing power contributed by all clients that makes up our whole distributed system.

6) No other methods to date can make use of idle CPU resources on the Internet while being acceptable to the public.

Some other methods such as network advertisers exchange their services with advertising. Clients have to download and read ads when they access web pages. However, network advertising can not allow clients to contribute their idle CPU resources, nor can the network server gain more computing power from clients. Similar to banner ads, network surveys is another example which require users to fill out survey forms in return for getting "free" services.

Other distributed computing methods either require direct access to client machines or special setup. Normally, it consists of a lot of static nodes and each node runs some daemon dedicated to computing. In other words, all nodes are full-time contributors. The aforementioned scenario is unlike sideband service, which only contributes one's free idle CPU resources when it connects to get service from the server. Therefore, the present invention is a win win, mutually beneficial procedure.

If we can force each client to perform one small chunk of tasks, we can accumulate much more computing time than any single computer because of the enormous number of computers on the Internet.

SUMMARY OF THE INVENTION

This invention provides a computer implemented method for a network server to gain enormous computing power from the Internet by exchanging services with clients' idle CPU time. Each client who visits the server will be assigned small pieces of computing tasks from the server when it requests service from the server. By dividing big computing tasks into multiple chunks of computing tasks, assigning then to each client dynamically and collecting results after the client finishes, the server can accumulate huge amounts of computing power. The hotter the server, the more computing power the server can obtain. Thus we can turn a network server into a supercomputer without much expense using this method, since we are using idle CPU time from all the clients.

DETAILED DESCRIPTION OF THE INVENTION

Figure 1:
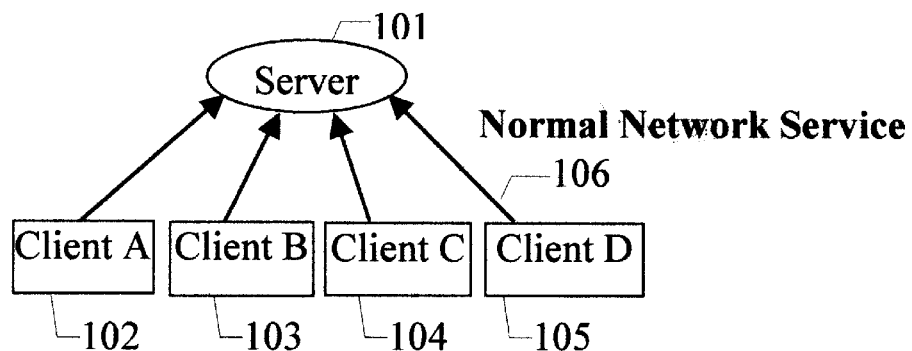
FIG. 1 is a prior art network client—server scenario.

In FIG. 1, Server 101 is a prior art network server. It could be a web server, telnet server, gopher server or any other network server that provides some service. Many clients connect to it to obtain services—web page, remote login, games, etc. Each client such as client A 102, B 103, C 104 or client D 105 is independent and asynchronous, which indicates they have no knowledge of each other. They connect to the server 101 to obtain the normal network service as shown by 106. After the service is finished, they will disconnect from server 101. Normally, the server is a multi-threaded process and can serve many requests from different clients simultaneously.

Figure 2:
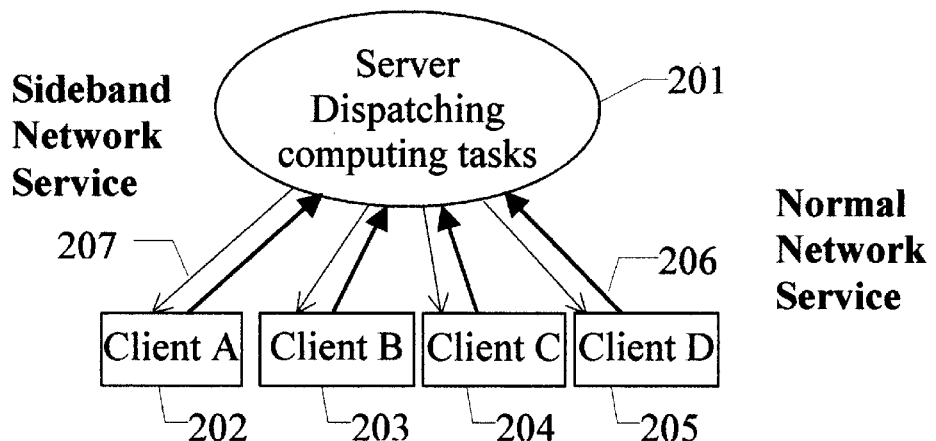
FIG. 2 is the sideband service of the present invention.

FIG. 2 is basically the same as FIG. 1, with an additional communication channel 207. In addition to a normal communication channel 206, where the clients get service from server 201, there is another communication channel 207 through which server 201 asks each client A 202, B 203, C 204, and D 205 to perform some tasks for him. The role of server 201 is to divide big computing tasks into small chunks and dispatch them to many independent clients and then collects the separate results from clients and put the separate results together to form the whole result. Since this communication channel does not exist before the clients access the server 201, we call this separate communication channel a sideband channel. And thus the evolution of the name sideband service is seen. In the Internet, any host could theoretically act as the client, yielding a global method.

Figure 3:
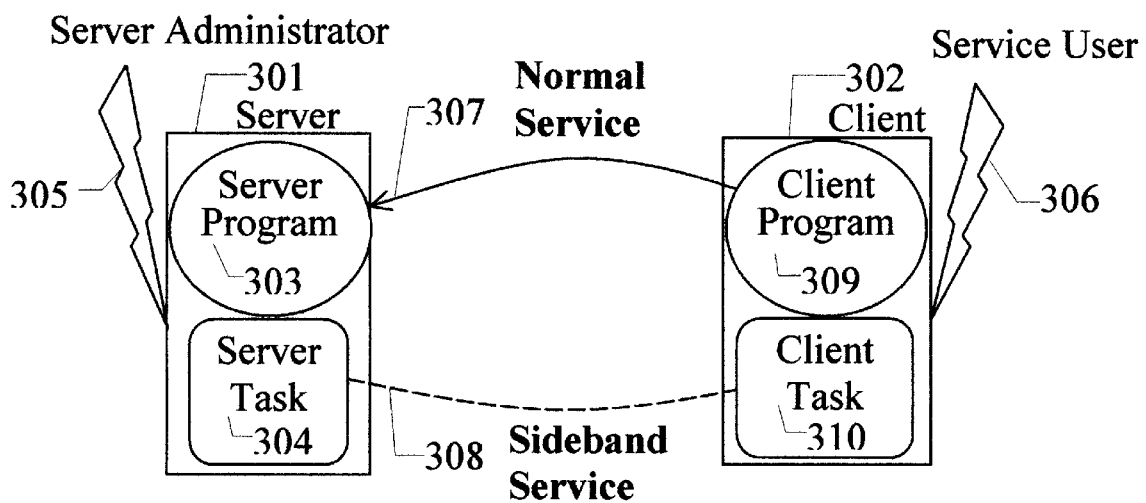
FIG. 3 is a schematic representation of sideband computing.

FIG. 3 gives us a more detailed view of sideband computing between network server 301 and one of its clients 302. Typically, we can divide the sideband computing method into 8 steps.

1) Set up service

Before we can make use of sideband service, we have to set up normal network services, such as setting up server programs and distributing client programs. Some client programs are widely available like web browser access WWW service. Others, like the ones for game servers need to be distributed to all client users. All users must download a special program in order to access resources in a chat or game server. Normally, for sideband service to work, a specially designed client program is needed.

To make it easy for the clients and the server to set up sideband service when the communicate with normal network service, the clients need some specific features. In particular, clients must be able to download executable codes form the server and the server must be able to transfer executable code to the clients. In addition, the server program must be able to accept tasks from a server administrator. In addition, the clients must have the ability to execute remote programs locally.

2) Problem definition and server task design

Here we refer to the server administrator 305 as the person who sets up and maintains normal network service 307. He is also responsible for assigning distributed tasks to the server. Server program 303 is used to complete normal network service 307 and communicate with the client program when setting up server task 304 and client task 310.

Client program 309 is the program in the users' computer. Its job is to connect to server 301 and complete a normal connection. In addition, it downloads client task 310 form the server, executes it and transfers the result back to the server. Server task 304 is the piece of code that divides distributed computing tasks into small chunks (client task 310) and sends the chunks to the client program for execution. It also has the responsibility of collecting results form the clients. Client task 310 is the small chunk of the tasks executed in each client computer under the control of the client program. Service user 306 is somebody that accesses the network service provided by server administrator 305.

For any given solvable problem that can be divided into many independent parts, we need to design the server task 304 according to task attributes. The function of the server task is illustrated in steps 5) through 7).

3) Assign server task 304 to server program 303

All of the above steps occur with the help of server administrator 305. All the following steps should be executed automatically thereafter.

4) When service user 306 runs the client program to access normal network service 307, the server sends the client task generated from the server task to the client program 309.

5) Client program 309 then executes a client task 310 without interrupting service user 306. It is executed only when client computer has enough idle computer time. Usually, it is run in the background with low priority to reduce the client computer's overhead. If it fails, client task 310 could be aborted and discarded.

6) After the client task 310 is finished, it transfers the result back to the server through sideband channel 308.

7) Server task 304 receives the results from the client tasks and saves them. Loop back to 4) for each network service conversation. For every new connection, assign a new task (including a timeout edit client task to support fault tolerance). The whole process might take hours to weeks until all client tasks have been completed. After completion, the server program performs normal service only.

8) Server task 304 or a special program is needed to summarize all results from client tasks 310 and print a report to server administrator 305.

Sideband service computing methods can be applied to virtually all existing network services. However, different services have different attributes, as shown below in Table 1. Table 1 compares the major characteristics of several major network services. The second column refers to average conversation time. Long term service has many advantages over transient service in that the client could connect to the server for a longer time (hours) so that larger tasks would be appropriate.

TABLE 1

Characteristics of Network Services

| SERVICE NAME | Average Service Time | Remote Execution | Special Client |
|---|---|---|---|
| WWW (web) | Transient, minutes | Yes (Java) | Normal |
| GOPHER | Transient, minutes | No | Special |
| FTP | Transient, minutes | No | Special |
| NNTP (news) | Transient, minutes | No | Special |
| TELNET | Long-term, hours | No | Special |
| MUD (game) | Long-term, hours | No | Special |
| CHAT (irc) | Long-term, hours | No | Special |
| CHESS (game) | Long-term, hours | No | Special |
| PROGRAM | Depends, depends | depends | Special |

The third column refers to whether that service supports remote program execution internally or not. For example, with the help of a Java enabled WWW browser, clients could easily download remote Java programs and execute the programs locally. The client tasks written in Java could be easily implemented since we don't need to offer a remote execution mechanism. For other services, we need to set up the remote execution in a specially designed client program.

The last row in Table 1 is a program which may seen strange at first glance. However, if we regard using a program as a type of service, it is quite meaningful. For example, whenever a user uses a program it could also perform the implied sideband connection to a predefined host and perform the same functions above in addition to its normal function. The more it is distributed and run, the more computing power is obtained.

Basically any useful program, even a screen saver could act as a service. Whenever somebody uses it, it connects to a predefined server to do some distributed task.

Usually, sideband computing shouldn't degrade a user system's performance. CPU intensive programs such as three dimensional rendering might not be suitable for this reason.

Based on the above discussion, any large network service provider (large meaning a large number of clients; Yahoo search engine or a popular game server are good candidates) can claim to be a public computing server. This computing server costs practically nothing to the service provider since the only resource it consumes is the idle CPU time of its clients. Anyone who accesses the service has to pay with his idle CPU time.

In addition, any user who has a complex task solvable by this method will pay the service provider to get his problem solved. Of course, it is also acceptable if he wants to set up his own server and solve the task on his own server. But he has to provide a good enough service to attract many users. No users yield no computing.

By charging task owners reasonable fees for computing, the service provider can offer better service to the public. Better service yields more clients, which yields stronger computing power. This is a positive cycle.

In summary, the advantages of sideband computing comprise:

a) Effective utilization of idle CPU resources, which reduces the expense down to a maintenance fee of the service. If large service providers combine this service to their current sites, the expense is nearly 0. It is much cheaper than buying clusters of workstations or CRAYs.

b) Enormous computing power and global scalability. Computing power is roughly proportional to the number of clients connected to the service and the average conversation time. Assume every user spends 10 minutes on a web server each time it is accessed, and that there are 1,000,000 user accesses to the server every day. Then the total CPU time available is 10,000,000 minutes, i.e. about 166,000 hours. Even if half of the clients are unavailable due to overhead or high load, there are still 83,000 hours available.

If we view all participating computers as a system, it is dynamically expandable and should work with any number of clients.

c) The server administrator needn't have direct access to client computers. Everything is done automatically by client—server communication once the service is set up.

d) A heterogeneous platform is possible. Any model of a computer, supercomputer, workstation or PC can work together with the help of the server. For example, the server could transmit a Mac client task to all Mac clients or an Intel client task to all Intel clients. In theory, the underlying language is not limited.

Compared with a traditional distributed computing method which is synchronous, computing in sideband is asynchronous in that we cannot anticipate the number of clients beforehand. Any client, in principle, can only communicate with the server. This makes one category of parallel computing problem—"Embarrassed Parallel Computing Problems" the best choice to solve the problem. Characteristics of that kind of problem is that a big parallel computing problem can be divided into small chunks and that there is not much correlation between those small chunks. Some examples are the prime factoring problem, fractal image generator, ray tracing calculations, password guessing, and simulation problems. Some simulating problems need to ran a model many times with different sets of parameters. Though this method is not suitable for some distributed problems which require interconnections between all nodes, this method is still very useful in that it provides a new way to utilize wasted CPU power in a reasonable and acceptable way.

Some people may care about the security of running the programs of others. However, this is not a big issue when secure languages such as Java are used. Furthermore, servers can be certified to prevent malicious actions.

Although the whole scenario for sideband computing doesn't limit the underlying computer language (any language can be used to implement the 8 steps), in practice, we will choose the best available computer language rather than reinventing the wheel. To ensure that the computing task will not endanger the user environment, we might restrict the language to some secure language such as Java or JavaScript which has been applied to serious scientific applications.

Java applet is an example of a secure program which runs under a virtual machine separated from the real machine. It has been used widely and some web sites are not viewable without a Java enabled browser. In the future, other methods such as CORBA could also be used to design a secure program. With regard to large tasks involving data storage, we may need to access the hardware of the client machines.

Worthy of mention is that most services will compete for clients during business hours. Sideband computing is "spontaneous" in that it might get high computing power in the daytime. But how about at night? How would one make use of those idle CPU resources when no user is using the service at night? One solution is to use a screensaver service which will try to connect to some host and continue working when users are away from their computers.

Another solution is that clients can be credited if they connect to the server beforehand, say at night. Then in the daytime the server can credit him for free services. As long as the clients exchanges his idle CPU power with valuable services, it is mutually beneficial as well. Besides, if different network servers honor the same "digital credit", once a client works for one server during its idle time (say at night) and earns some credit, it could be able to use the credit earned in any other server to receive any services without a fee. This could greatly improve flexibility and attract more network servers and clients to use this method. Under such circumstances, the sideband channel can be separated from the normal network service.

In addition, the sideband computing method can be extended to other distributed services such as distributed testing or distributed searching. Any computer, with the willingness to accept those tasks from outside, to be exposed to the public and to work for anyone on the Internet, can earn credits (at idle times, normally). And network servers can contact those clients if they need more computing power.

Furthermore, if the network can migrate processes from one client to another, it is also possible to form a virtual computer by all current clients connecting to the server. Such a virtual computer could be very powerful if the number of clients are huge and clients are using long time services of the server.

A sample implementation of the sideband computing method on a fractal image calculation is tested using a web server and CGI. The algorithm is fairly simple and is given here an illustration. The original paper contains more details such as sample results and analysis. The abridged description is as follows:

1) Server Distributing CGI Task:

Generate normal home page, (to offer normal web service) if no more tasks, doesn't generate Java Applet tag, otherwise, in the generated HTML context, includes the Java Applet.

2) Java Applet (Client task):

Open another connection to the server,

Get parameters from server, calculate results,

Call Server Collection Cgi to send results back.

3) Server Collection CGI:

Receive results from remote client, store in a file,

Clear solved portion for server distribution CGI task.

The whole system operates as follows: Every time a user visits the web page, the client task (Java applet) is started in order to do the calculating in the browser (invisible to client user). It calculates silently and after each portion of the image is complete, the results are sent back to the server. The algorithms are:

Algorithm 1) Task divisor (gen.tcl)

1. Given parameters, generate para.txt for all common parameters
2. Generate file tocalc.txt, each line of it is one task, to calculate one points of the fractal
3. Create file calcing.txt and calced.txt
4. Create log file.

Algorithm 2) Server CGI (send.sh.cgi)

1. Started by client via URL connection
2. If { Received result from client } {
   Read result, store in calced.txt
   Delete the task from calcing.txt }
3. If { no more tasks in tocalc.txt } {
   move task from calcing.txt }
4. If { still no more task } {
   Job finished.
5. Select the first task from tocalc.txt
6. Move the task to calcing.txt
7. Send new task to the client Algorithm 3) Client (Java Applet comp.java)

1. Start as a separate thread with low priority,
2. While {System idle } {
3. Try to connect to Server CGI
4. If { Result comes out }
   Send result back to Server CGI
   else
   call Server CGI directly
5. Read task parameters from server CGI
6. Perform calculation, get result. } Until Error or No more task from server.

What is claimed is:

1. A method in a metacomputing, distributed network of utilizing remote client resources in the network, comprising:

a server that implements tasks by utilizing idle resources in multiple clients;

individual communication channels between each client and the server;

a second, separate dedicated communication channel (sideband channel) between each client and server, through which the server distributes the tasks to the each client downstream and through which each of the clients sends the results of the task upstream to the server.

2. The method of claim 1, further comprising the division, by the server, of large parallel computing tasks into smaller tasks to be dispatched to the clients;

reassembly, by the server, of the results computed by the clients.

3. The method of claim 1, wherein the server is a web server, telnet server, chat server, game server or other network server that communicates with the clients to provide their service.

4. The method of claim 1, wherein the client runs the distributed task in the background, without user interference.

5. The method of claim 1, wherein the client downloads a Java applet from the web server, runs the applets, receives some tasks from the server, computes the tasks, and sends back the results to the server.

6. The method of claim 1, wherein the network server is in the Internet and its clients are in the Internet or in an Intranet.

7. The method of claim 1, wherein the network server is in an arbitrary network environment that provides some services accessible to all its clients.

8. A method in a metacomputing, distributed network of utilizing remote client resources in the network in exchange for free access to server resources, comprising:

a server that implements tasks by breaking the tasks into smaller subtasks and utilizing idle resources in multiple clients to perform these subtasks;

individual communication channels between each client and the server;

a second, separate dedicated communication channel (sideband channel) between each client and server, through which the server distributes the tasks to the each client downstream and through which each of the clients sends the results of the task upstream to the server;

wherein the server has access to the idle client resources in exchange for the client having free access to server resources.

9. The method of claim 8, wherein the server resources are programs such as screen savers to be downloaded and run by the clients.

10. The method of claim 8, further comprising:

the client receiving credit if the client's resources are utilized at night or at other optimal computing times for the server;

the client receiving the free server services at another time to reduce bandwidth competition.

11. The method of claim 10, wherein the same credit could be honored by different network servers, allowing one client who provided resources for one server, use of the earned credit for free access to any other network server services (an Internet bartering system).

12. The method of claim 8, wherein the server could dispatch simulation problems with different sets of parameters to different clients.

13. The method of claim 8, wherein the server will collect individual results from each client and reassemble the individual results in the finished solution.

14. The method of claim 8, wherein the client program runs under a secure environment without endangering the integrity of the local machine user.

15. The method of claim 8, wherein the client sells its resources for services, and the server sells service server access rights to the multiple clients.

16. The method of claim 11, wherein the client offers its resources and exposure to the public for any network server in exchange for earning credit for server services.

17. The method of claim 8, wherein the server and all its clients form a virtual computing machine, wherein the server migrates processes from one client to another client.

18. The method of claim 8, wherein the server and the clients can be any processing entity that can perform calculations on the network.

* * * * *